(12) United States Patent
Song

(10) Patent No.: US 12,390,954 B2
(45) Date of Patent: Aug. 19, 2025

(54) AUTOMATIC NON-REPETITIVE FLOOR PATTERN COMBINING EQUIPMENT

(71) Applicant: ELEGANT HOME-TECH CO., LTD., Jinfeng Town (CN)

(72) Inventor: Jincheng Song, Jinfeng Town (CN)

(73) Assignee: ELEGANT HOME-TECH CO., LTD., Jinfeng Town (CN)

( * ) Notice: Subject to any disclaimer, the term of this patent is extended or adjusted under 35 U.S.C. 154(b) by 260 days.

(21) Appl. No.: 17/772,382

(22) PCT Filed: Jan. 4, 2021

(86) PCT No.: PCT/CN2021/070172
§ 371 (c)(1),
(2) Date: May 5, 2022

(87) PCT Pub. No.: WO2022/088497
PCT Pub. Date: May 5, 2022

(65) Prior Publication Data
US 2023/0399181 A1    Dec. 14, 2023

(30) Foreign Application Priority Data

Nov. 2, 2020   (CN) .......................... 202011200854.6

(51) Int. Cl.
*B27M 3/06*      (2006.01)
*B27D 1/10*      (2006.01)
(Continued)

(52) U.S. Cl.
CPC .................. *B27M 3/06* (2013.01); *B27D 1/10* (2013.01); *B27M 3/04* (2013.01); *B65G 47/912* (2013.01)

(58) Field of Classification Search
CPC .. B27M 3/04; B27M 3/06; B27D 1/10; B65G 47/912; B65G 47/917; B65G 47/918
See application file for complete search history.

(56) References Cited

U.S. PATENT DOCUMENTS 2,828,794 A * 4/1958 Baumann .................. B44B 9/00
                                                                156/556
3,255,067 A * 6/1966 Sontheim ............. B65G 57/302
                                                               156/522
(Continued)

FOREIGN PATENT DOCUMENTS

CN       103612884 A      3/2014
CN       205294248 U      6/2016
(Continued)

OTHER PUBLICATIONS

International Search Report from International Application No. PCT/CN2021/070172 mailed Jun. 25, 2021.

*Primary Examiner* — Gene O Crawford
*Assistant Examiner* — Keith R Campbell
(74) *Attorney, Agent, or Firm* — Ballard Spahr LLP

(57) ABSTRACT

An automatic non-repetitive floor pattern combining equipment is provided. The equipment comprises a conveying frame, supporting frames, floor strip feeding mechanisms, a mechanical arm and a storage table, wherein a conveying belt is provided on a top of the conveying frame, brackets are symmetrically distributed on two sides of the conveying frame, and to-be-combined floor strips with different patterns are placed on the brackets respectively; one of the supporting frames is installed at tops of two brackets of the plurality of brackets which are symmetrically provided on the two sides of the conveying frame, and the feeding mechanisms are provided on the supporting frames and reciprocate along the supporting frames; the feeding mechanisms are used for feeding the floor strips on the two sides of the conveying frame to the conveying belt at intervals.

9 Claims, 2 Drawing Sheets

(51) Int. Cl.
*B27M 3/04* (2006.01)
*B65G 47/91* (2006.01)

(56) References Cited

U.S. PATENT DOCUMENTS

| | | | | |
|---|---|---|---|---|
| 3,277,935 A | * | 10/1966 | Rebick | B27M 3/04 144/242.1 |
| 3,370,769 A | * | 2/1968 | Price, Jr. | B27M 3/04 227/3 |
| 11,993,466 B2 | * | 5/2024 | Song | B65G 49/064 |

FOREIGN PATENT DOCUMENTS

| | | | |
|---|---|---|---|
| CN | 105904520 A | | 8/2016 |
| CN | 210060759 U | | 2/2020 |
| CN | 210651130 U | | 6/2020 |
| CN | 211733113 U | | 10/2020 |
| DE | 3637114 A1 | * | 10/1986 |
| DE | 3928850 A1 | | 3/1991 |

* cited by examiner

AUTOMATIC NON-REPETITIVE FLOOR PATTERN COMBINING EQUIPMENT

CROSS REFERENCE TO RELATED APPLICATION

This patent application is a U.S. national stage application of International Patent Application No. PCT/CN2021/070172, filed on Jan. 4, 2021, which claims priority to Chinese Patent Application No. 202011200854.6 filed on Nov. 2, 2020, the disclosure of which is incorporated herein, in its entirety, by reference.

TECHNICAL FIELD

The present disclosure relates to the technical field of floor strip processing, and particularly relates to automatic non-repetitive floor pattern combining equipment.

BACKGROUND ART

In the existing floor strip production process, only one pattern of floor strip is generally produced in the same batch. One or more patterns are spliced by the floor strips with multiple patterns when the floor strip are spliced, the floor strips with different patterns are manually selected, and the floor strips which are matched and spliced can be paved, so that the workload of workers is greatly increased, and the working efficiency is reduced. The phenomenon of splicing errors caused by pattern errors exists, so that the construction progress is influenced. At present, no special equipment for floor strip combination exists in the market.

SUMMARY

The present disclosure aims to provide automatic non-repetitive floor pattern combining equipment to solve the above-mentioned problems in the prior art. The equipment can automatically complete floor pattern combination and placement, and has a high accuracy, reduced workload of operators, and better applicability.

In order to achieve the purpose, the present disclosure provides the following solution: the present disclosure provides automatic non-repetitive floor pattern combining equipment, comprising a conveying frame, supporting frames, floor strip feeding mechanisms, a mechanical arm and a storage table, wherein a conveying belt is provided on a top of the conveying frame, a plurality of brackets are symmetrically distributed on two sides of the conveying frame, and to-be-combined floor strips with different patterns are placed on the brackets respectively; one of the supporting frames is installed at tops of two brackets of the plurality of brackets which are symmetrically provided on the two sides of the conveying frame, and the floor strip feeding mechanisms are provided on the supporting frames and reciprocate along the supporting frames; the floor strip feeding mechanisms are used for feeding the floor strips on the two sides of the conveying frame to the conveying belt at intervals; and tail end of the conveying belt is in butt joint with a storage platform, and the mechanical arm is used for grabbing the floor strips combined on the storage platform and placing the floor strips composed on the storage platform.

Preferably, the supporting frames are rectangular frames installed at the top of the conveying frame, and two short edges of each rectangular frame are parallel to a conveying direction of the conveying belt and located on outer sides of the brackets; inner sides of two long edges of the rectangular frame are provided with racks and sliding grooves, two sides of a fixed plate of each floor strip feeding mechanism are slidably arranged in the sliding grooves, gears driven by a first servo motor are installed on the fixed plate, and the gears are matched with the racks.

Preferably, position sensors are provided on tail ends of the two long edges of the supporting frame and connected with a control center through electric signals.

Preferably, the floor strip feeding mechanism comprises a vacuum adsorption table, a linear guide rail and a second servo motor, the vacuum adsorption table is fixedly connected with sliding blocks provided on the linear guide rail, and the second servo motor drives the sliding blocks to move up and down along the linear guide rail vertically arranged.

Preferably, the vacuum adsorption table comprises a vacuum detector and a plurality of vacuum suckers, the plurality of vacuum suckers are uniformly distributed on a bottom surface of the vacuum adsorption table and are used for tightly sucking floor strips, and the vacuum detector is used for detecting pressure values of the vacuum suckers.

Preferably, the vacuum adsorption table further comprises a plurality of longitudinal sliding grooves and transverse sliding grooves, the plurality of longitudinal sliding grooves are fixed to the bottom working surface of the vacuum adsorption table at equal intervals in parallel, a plurality of sets of sliding blocks are correspondingly arranged in each longitudinal sliding groove, each set of sliding blocks is fixedly connected with one transverse sliding groove, and the multiple sets of transverse sliding grooves are parallel; and the plurality of vacuum suckers are slidably connected with the transverse sliding grooves.

Preferably, baffle plates are provided on the three side edges of the storage platform.

Preferably, a floor strip clamping mechanism is provided on the hand action end of the mechanical arm and used for clamping the combined floor strips on the storage platform and then moving the floor strips to the storage platform.

Preferably, the floor strip clamping mechanism comprises a plurality of rows of clamping claws arranged in parallel, each clamping claw comprises a clamping air cylinder, a connecting rod and a clamping jaw, and the connecting rod connected with a working end of the clamping air cylinder drives the clamping jaw to clamp the floor strips.

Preferably, isolation nets are provided on the outer sides of the brackets, the outer side of the conveying frame and the outer side of the storage table in a surrounding mode.

Compared with the prior art, the present disclosure has achieved the following beneficial technical effects:

According to the automatic non-repetitive floor pattern combining equipment, floor strips with different patterns can be fed at intervals from the two sides of the conveying frame through the floor strip feeding mechanisms, the floor strips with different patterns are combined according to preset requirements, the floor strips are uniformly placed on the storage table after being combined, and the floor strips in color matching can be conveniently and directly paved subsequently, so that a large amount of time is saved, and great convenience is brought to constructors.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Reference signs: 1, supporting frame; 2, conveying frame; 3, conveying belt; 4, fixed plate; 5, isolation net; 6, bracket; 7, vacuum adsorption table; 8, storage table; 9, storage platform; 10, floor strip clamping mechanism; 11, mechanical arm; 12, clamping air cylinder; 13, connecting rod; and 14, clamping jaw.

DETAILED DESCRIPTION OF THE EMBODIMENTS

The following clearly and completely describes the technical solution in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure aims to provide automatic non-repetitive floor pattern combining equipment to solve the problems in the prior art, the equipment can automatically complete the floor pattern combination and placement, and has a high accuracy, reduced workload of operators, and better applicability.

To make the foregoing objective, features and advantages of the present disclosure clearer and more comprehensible, the present disclosure is further described in detail below with reference to the attached figures and specific embodiments.

Figure 1:
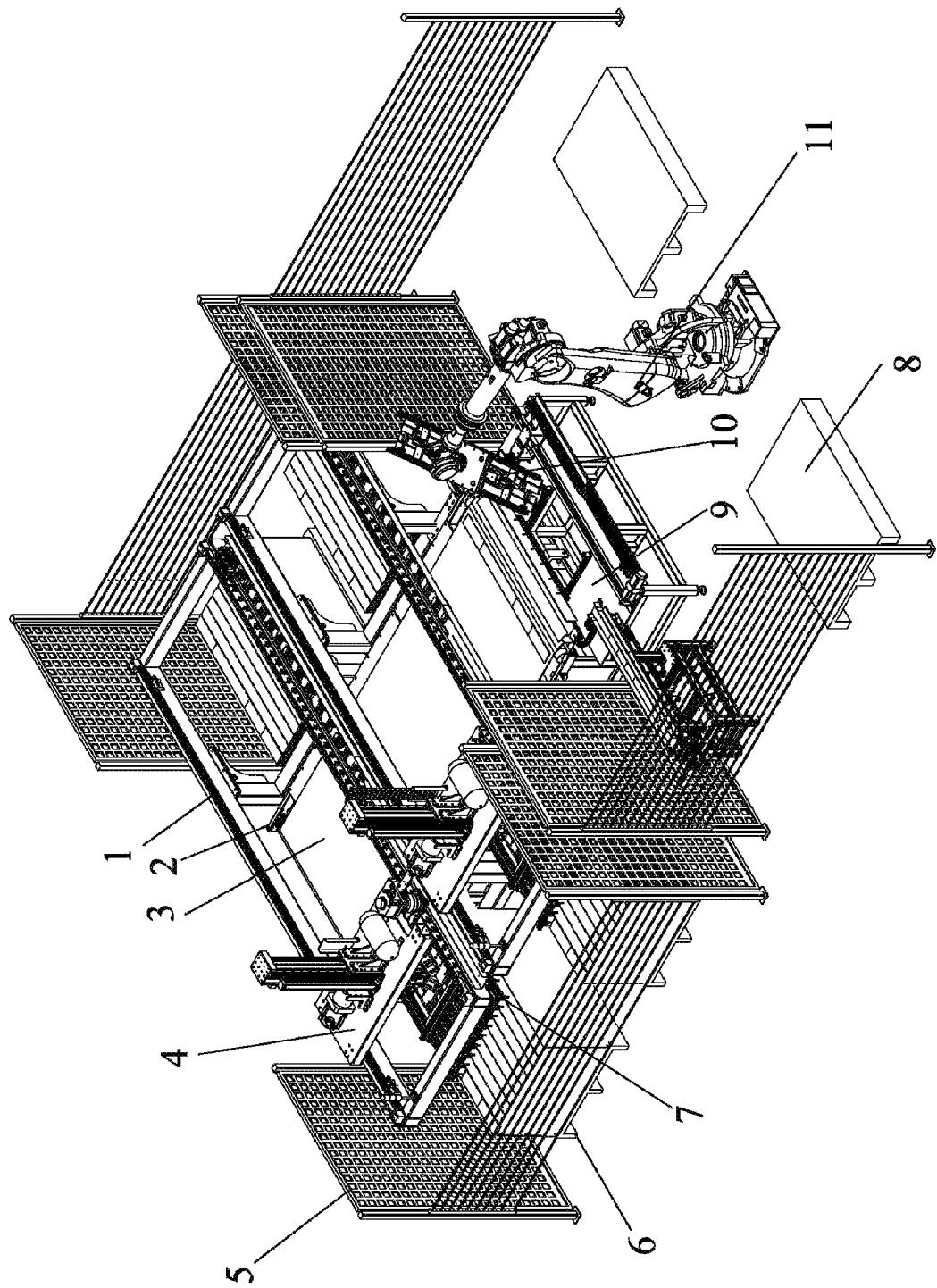
FIG. 1 is an integral structural schematic diagram of automatic non-repetitive floor pattern combining equipment.
Figure 2:
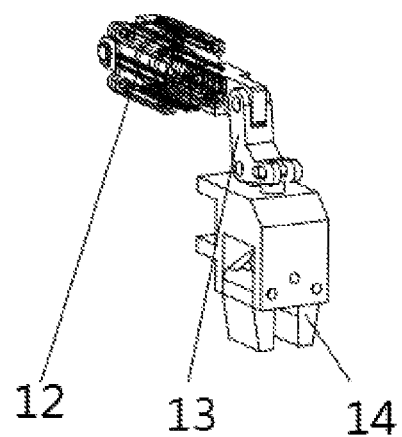
FIG. 2 is a structural composition diagram of a clamping claw.

As shown in FIG. 1 to FIG. 2, automatic non-repetitive floor pattern combining equipment provided by the embodiment comprises a conveying frame 2, supporting frames 1, floor strip feeding mechanisms, a mechanical arm 11 and a storage table 8. A conveying belt 3 is arranged at the top of the conveying frame 2, a plurality of brackets 6 are symmetrically distributed on the two sides of the conveying frame 2, and to-be-combined floor strips with different patterns are placed on the brackets 6 respectively. One of the supporting frames 1 is correspondingly installed at the tops of the two brackets 6 symmetrically provided on the two sides of the conveying frame 2, and the floor strip feeding mechanisms are provided on the supporting frames 1 and can reciprocate along the supporting frames 1. The floor strip feeding mechanisms are used for feeding the floor strips on the two sides of the conveying frame 2 to the conveying belt 3 at intervals, and the tail end of the conveying belt 3 is in butt joint with a storage platform 9, and the mechanical arm 11 is used for grabbing the combined floor strips on the storage platform 9 and placing the combined floor strips on the storage platform 8.

Firstly, the floor strips with different patterns are placed on the brackets 6 respectively, the combining equipment is started to work, the conveying belt 3 is in a running state all the time, and the floor strip feeding mechanisms are controlled by the control center to feed the floor strips with different patterns at intervals. As shown in FIG. 1, the four brackets 6 are arranged. It is assumed that the brackets 6 below the first supporting frame 1 away from the mechanical arm 11 are the first bracket 6 and the second bracket 6 respectively, and the brackets 6 below the second supporting frame 1 close to the mechanical arm 11 are the third bracket 6 and the fourth bracket 6 respectively. The servo motor in the floor strip feeding mechanisms is controlled by the control center, so as to feed the floor strips on the first bracket 6, the second bracket 6, the third bracket 6 and the fourth bracket 6 to the conveying belt 3 at intervals. The conveying belt 3 conveys the non-repetitive combined floor strips to the storage platform 9, and then the mechanical arm 11 grabs the floor strips from the storage platform 9 and moves the floor strips to the storage table 8.

In the embodiment, in order to feed the floor strip on the brackets 6 at intervals, the supporting frame 1 is a rectangular frame installed at the top of the conveying frame 2, and the two short edges of the rectangular frame are parallel to the conveying direction of the conveying belt 3 and located on the outer sides of the brackets 6. The two long edges of the rectangular frame are provided at inner sides thereof with racks and sliding grooves, the two sides of a fixed plate 4 of the floor strip feeding mechanism are slidably arranged in the sliding grooves, gears driven by a first servo motor are installed on the fixed plate 4, and the gears are matched with the racks. Position sensors are provided at the tail ends of the two long edges of the supporting frame 1 and connected with a control center through electric signals. After the floor strip feeding mechanisms move to the positions where the position sensors are located, the floor strip feeding mechanisms begin to return. Gear and rack transmission between the fixed plate 4 and the supporting frame 1 is achieved through the first servo motor, and such that the fixed plate 4 can reciprocate left and right along the length direction of the supporting frame 1. Meanwhile, the sliding grooves play a role in auxiliary guiding, and the fixed plate 4 is prevented from deviating in the moving process. Due to the fact that the same supporting frame 1 corresponds to two brackets 6, floor strips on the two brackets 6 are necessarily fed at intervals on the premise that only one floor strip feeding mechanism is arranged. In combination with FIG. 1, four brackets 6 are arranged in FIG. 1, two floor strip feeding mechanisms are arranged, and left-right movement of the two floor strip feeding mechanisms is asynchronous, to allow feeding at four positions to be performed intermittently, and finally, the patterns of the floor strips fed to the conveying belt 3 are not repeated.

In order to ensure stable feeding without falling, in the embodiment, the floor strip feeding mechanism comprises a vacuum adsorption table 7, a linear guide rail and a second servo motor, the vacuum adsorption table 7 is fixedly connected with sliding blocks provided on the linear guide rail, and the second servo motor drives the sliding blocks to move up and down along the vertically arranged linear guide rail. The vacuum adsorption table 7 moves downwards to suck up the floor strips, then the vacuum adsorption table 7 moves upwards and moves left and right along with the fixed plate 4. After reaching the position above the conveying belt 3, the vacuum adsorption table 7 moves downwards and discharges the floor strips. After discharging, the vacuum adsorption table 7 returns to its original position. The vacuum adsorption table 7 comprises a vacuum detector and a plurality of vacuum suckers, the vacuum suckers are uniformly distributed on the bottom surface of the vacuum adsorption table 7 and used for tightly sucking the floor strips, and the vacuum detector is used for detecting pressure values of the vacuum suckers. The vacuum detector detects the vacuum pressure values of the suckers, after the vacuum pressure values reach set pressure values (the suction force between the suckers and the floor strips is enough), the floor strip feeding mechanisms act again to move and feed materials. The vacuum detector and the vacuum suckers cooperates, so that the suction force between the floor strips and the suckers is enough to suck up the floor strips, and the phenomena of material sliding and material falling during feeding and moving material can be prevented, and the set pressure value of the vacuum detector can be preset according to different suction forces required by different floor strips.

In order to adapt to different specifications of floor strips, in the embodiment, the vacuum adsorption table 7 further comprises a plurality of longitudinal sliding grooves and transverse sliding grooves, the plurality of longitudinal sliding grooves are fixed to the bottom working surface of the vacuum adsorption table 7 at equal intervals in parallel. A plurality of sliding blocks are correspondingly arranged in each longitudinal sliding groove, each sliding block is fixedly connected with one transverse sliding groove, and the multiple transverse sliding grooves are parallel. The vacuum suckers are slidably connected with the transverse sliding grooves. The vacuum adsorption platform can be suitable for interval adjustment adsorption of raw materials with different specifications and sizes. In the specific operation, the distance between every two adjacent suckers can be adjusted by adjusting the positions of corresponding sliding blocks in the transverse sliding grooves of the vacuum suckers; and the distance between every two adjacent transverse sliding grooves can be adjusted by adjusting the positions of the sliding blocks in the longitudinal sliding grooves at the tops of the transverse sliding grooves. Wherein, the upper and lower positions of the transverse sliding grooves and the longitudinal sliding grooves are not limited, the transverse sliding grooves can be arranged at the top, and the longitudinal sliding grooves can be arranged at the lower part.

In the embodiment, in order to prevent the floor strips at the storage platform 9 from falling off, baffle plates are provided on the three side edges of the storage platform 9, and a plurality of infrared sensors are further provided on the baffle plates located at two side. The distance between every two adjacent infrared sensors is smaller than the width of the floor strip. When the multiple infrared sensors detect signals, the combined floor strips on the storage platform 9 are completely paved. At the moment, the control center controls the mechanical arm 11 to rotate to the top of the storage platform 9, and the floor strip clamping mechanism 10 transfers the floor strips to the storage table 8 in time. A floor strip clamping mechanism 10 is arranged at the hand action end of the mechanical arm 11 and used for clamping the combined floor strips on the storage platform 9 and then moving the floor strips to the storage platform 8.

In order to stably and accurately complete transferring of the floor strips, in the embodiment, the floor strip clamping mechanism 10 comprises a plurality of rows of clamping claws arranged in parallel, the clamping claw comprises a clamping air cylinder 12, a connecting rod 13 and a clamping jaw 14, and the connecting rod 13 connected with the working end of the clamping air cylinder 12 drives the clamping jaw 14 to clamp the floor strips. The multiple rows of clamping claws are pressed to the positions of the floor strips on the storage platform 9, the clamping air cylinder 12 of each clamping claw is started, drives the clamping jaw 14 via the connecting rod 13 to clamp the floor strips, and the mechanical arm 11 rotates to move the floor strips to the storage table 8; and the clamping jaws 14 are released, so that all clamping claws return.

In addition, in order to guarantee the safety of operators and prevent other personnel from approaching the combined equipment. In the automatic non-repetitive floor pattern combining equipment, isolation nets 5 are provided on the outer sides of the brackets 6, the outer side of the conveying frame 2 and the outer side of the storage table 8 in a surrounding mode.

It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, therefore, all changes, including the meanings and scopes of equivalent elements, of the claims are aimed to be included in the present disclosure, and any mark of attached figures in the claims should not be regarded as limitation to the involved claims.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. Automatic non-repetitive floor pattern combining equipment, comprising:
   a conveying frame,
   supporting frames,
   floor strip feeding mechanisms,
   a mechanical arm,
   a storage table,
   a conveying belt provided on a top of the conveying frame, and
   a plurality of brackets are symmetrically distributed on two sides of the conveying frame, and to-be-combined floor strips with different patterns are placed on the brackets respectively;
   wherein one of the supporting frames is installed at tops of two brackets of the plurality of brackets which are symmetrically provided on the two sides of the conveying frame, and
   wherein the floor strip feeding mechanisms are provided on the supporting frames and reciprocate along the supporting frames; the floor strip feeding mechanisms are used for feeding the floor strips on the two sides of the conveying frame to the conveying belt at intervals; and
   wherein the conveying belt includes a tail end in butt joint with a storage platform, and the mechanical arm is used for grabbing the floor strips combined on the storage platform and placing the floor strips composed on the storage table.

2. The automatic non-repetitive floor pattern combining equipment according to claim 1, wherein the supporting frames are rectangular frames installed at the top of the conveying frame, and two short edges of each rectangular frame are parallel to a conveying direction of the conveying belt and located on outer sides of the brackets; inner sides of two long edges of the rectangular frame are provided with racks and sliding grooves, two sides of a fixed plate of each floor strip feeding mechanism are slidably arranged in the sliding grooves, gears driven by a first servo motor are installed on the fixed plate, and the gears are matched with the racks.

3. The automatic non-repetitive floor pattern combining equipment according to claim 2, further comprising position sensors provided on tail ends of the two long edges of the supporting frame and connected with a control center through electric signals.

4. The automatic non-repetitive floor pattern combining equipment according to claim 2, wherein the floor strip feeding mechanism each comprises a vacuum adsorption table, a linear guide rail and a second servo motor, the vacuum adsorption table is fixedly connected with sliding blocks provided on the linear guide rail, and the second servo motor drives the sliding blocks to move up and down along the linear guide rail vertically arranged.

5. The automatic non-repetitive floor pattern combined equipment according to claim 4, wherein the vacuum adsorption table comprises a vacuum detector and a plurality of vacuum suckers, the plurality of vacuum suckers are uniformly distributed on a bottom surface of the vacuum adsorption table and are used for tightly sucking floor strips, and the vacuum detector is used for detecting pressure values of the vacuum suckers.

6. The automatic non-repetitive floor pattern combining equipment according to claim 1, further comprising baffle plates provided on three side edges of the storage platform.

7. The automatic non-repetitive floor pattern combining equipment according to claim 1, further comprising a floor strip clamping mechanism provided on an end of the mechanical arm and used for clamping the floor strips on the storage platform and then moving the floor strips to the storage table.

8. The automatic non-repetitive floor pattern combining equipment according to claim 7, wherein the floor strip clamping mechanism comprises a plurality of rows of clamping claws arranged in parallel, each clamping claw comprises a clamping air cylinder, a connecting rod and a clamping jaw, and the connecting rod connected with a working end of the clamping air cylinder drives the clamping jaw to clamp the floor strips.

9. The automatic non-repetitive floor pattern combining equipment according to claim 1, further comprising isolation nets provided on the outer sides of the brackets, the outer side of the conveying frame and the outer side of the storage table.

* * * * *